United States Patent [19]

Maupin

[11] Patent Number: 4,974,862
[45] Date of Patent: Dec. 4, 1990

[54] HAND TRUCK WITH SAFETY DEVICE
[76] Inventor: David J. Maupin, P.O. Box 124, Muldrow, Okla. 74948
[21] Appl. No.: 356,139
[22] Filed: May 24, 1989
[51] Int. Cl.⁵ .............................................. B62B 1/12
[52] U.S. Cl. ............................. 280/47.27; 280/47.28; 280/47.29
[58] Field of Search ............... 280/47.17, 47.24, 47.27, 280/47.28, 47.29

[56] References Cited
U.S. PATENT DOCUMENTS

| | | | |
|---|---|---|---|
| 1,428,180 | 9/1922 | More | 280/47.29 |
| 1,948,206 | 2/1934 | Earle et al. | 280/47.28 |
| 2,214,311 | 9/1940 | Stevens | 280/47.27 |
| 3,155,256 | 1/1964 | Cook | 214/371 |
| 3,722,906 | 3/1973 | Pierson et al. | 280/47.4 |
| 3,857,579 | 12/1974 | Hoodenpyle | 280/47.2 |
| 4,235,449 | 11/1980 | Tarran | 280/47.28 |

*Primary Examiner*—Charles A. Marmor
*Assistant Examiner*—Richard Camby
*Attorney, Agent, or Firm*—Fleit, Jacobson, Cohn, Price, Holman & Stern

[57] ABSTRACT

A hand truck is provided including a forwardly projecting load platform and a generally U-shaped bumper is mounted from the hand truck for pivotal oscillation about a horizontal transverse axis between a lowered position closely overlying and projecting outwardly of the peripheral margins of the load platform and a raised position disposed fully rearward of the front side of the wheeled upstanding frame of the hand truck forwardly of which the load platform projects. The bumper is resilient and therefore prevent injury to objects which would otherwise be damaged or injured as a result of the platform abutting thereagainst and the front side of the upstanding frame of the hand truck defines forwardly opening horizontal recess structure in which the bight portion of the U-shaped bumper is fully recessed when the bumper is in the raised position thereof.

12 Claims, 2 Drawing Sheets

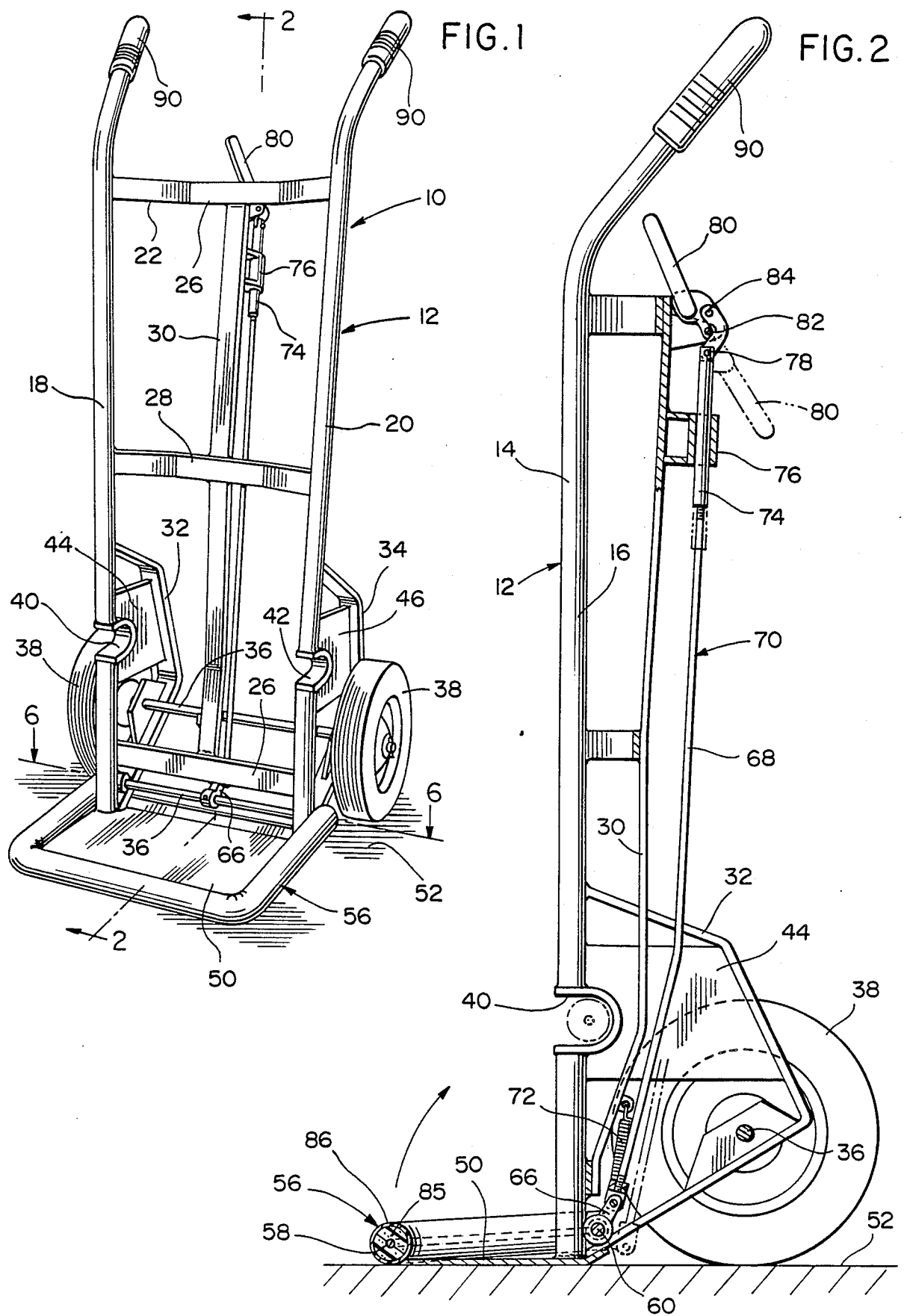

HAND TRUCK WITH SAFETY DEVICE

BACKGROUND OF THE INVENTION

1. Field of the Invention

This invention relates to a conventional upstanding hand truck including a lower floor engaging and forwardly projecting load platform and equipped with a U-shaped bumper movable between an inverted raised position recessed rearwardly of the front side of the upstanding frame of the hand truck when the latter is loaded and a generally horizontal position closely overlying the load platform and projecting outwardly beyond at least substantially all marginal edges of the load platform when the hand truck is unloaded, to thereby prevent injurious contact of the peripheral marginal edges of the load platform, when the hand truck is not loaded, with wall surfaces, door jambs and the ankles or legs of nearby persons when the hand truck is being moved from one location to another while unloaded.

2. Description of the Related Art

Various different forms of hand trucks and similar devices heretofore have been provided with cushioning structures such as the hand trucks disclosed in U.S. Pat. Nos. 635,027, 1,428,180, 3,155,256, 3,722,906 and 3,857,579. However, these previously patented devices do not include a retractable safety bumper such as that disclosed hereinafter.

SUMMARY OF THE INVENTION

The hand truck of the instant invention utilizes a conventional upstanding wheeled frame including a floor engageable and supported forwardly projecting load platform and the hand truck frame and load platform are pivotable, as a unit, about the axis of rotation of the support wheels of the hand truck into a transport position with the frame of the hand truck rearwardly and upwardly inclined and the load platform of the hand truck elevated above the associated floor surface and disposed in a forwardly and upwardly inclined position, this position of the hand truck being used during movement thereof from one location to another.

With conventional hand trucks, when they are being transported from one location to another and are empty, present peripheral edges of the forwardly and upwardly inclined load platforms thereof can cause serious injury to the ankles and lower legs of nearby persons if contact of the peripheral edges are made therewith. In addition, wall surfaces and door jambs also may be damaged by contact of the aforementioned peripheral edges of the load platforms of hand trucks if they are contacted by such peripheral edges during movement of the hand trucks while unloaded.

Accordingly, it is the main object of this invention to provide a safety bumper for the peripheral edges or marginal portions of hand truck load platforms that will prevent contact of load platform peripheral edges with the ankles and lower legs of nearby persons and with wall surfaces or door jambs during transport of the hand trucks from one location to another while unloaded.

Another object of this invention is to provide a hand truck with a bumper for the peripheral edges of the load platform of the hand truck and with the bumper being supported from the hand truck in a manner such that it may be shifted to a totally out of the way position preparatory to loading of the hand truck in the conventional manner.

Still another important object of this invention is to provide a hand truck load platform bumper in accordance with the preceding objects and which may be readily incorporated into the manufacture of new hand trucks.

A final object of this invention to be specifically enumerated herein is to provide a load platform bumper equipped hand truck which will conform to conventional forms of manufacture, be of simple construction and easy to operate so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a hand truck constructed in accordance with the present invention;

FIG. 2 is an enlarged vertical sectional view taken substantially upon the plane indicated by the section line 2—2 of FIG. 1;

DESCRIPTION OF THE PREFERRED EMBODIMENT

Figure 3:
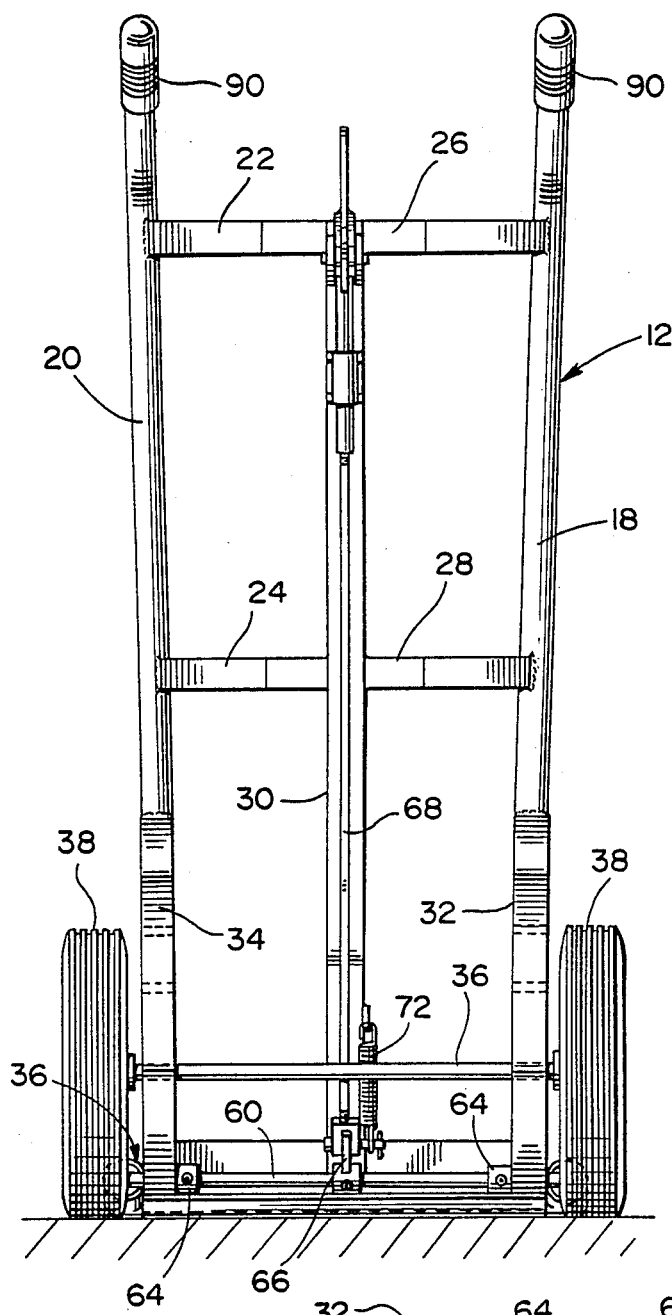
FIG. 3 is a rear elevational view of the hand truck with the load platform bumper in a horizontal operative position.

Referring now more specifically to the drawings, the numeral 10 generally designates a hand truck constructed in accordance with the present invention. The hand truck 10 includes an upstanding frame referred to in general by the reference numeral 12 and including a front side 14 and a rear side 16. The frame 12 includes a pair of opposite side uprights 18 and 20 interconnected by three vertically spaced transverse braces 22, 24 and 26 extending and secured therebetween, the braces 22 and 24 including rearwardly offset mid-portions 26 and 28, respectively, and a center vertical brace 30 extending between and rigidly interconnecting the mid-portions of the braces 22, 24 and 26.

Also, the lower end portions of the uprights 18 and 20 include opposite side skids 32 and 34 supported therefrom and a transverse axle 36 has its opposite ends supported from the skids 32 and 34. A pair of support wheels 38 are journalled from the opposite terminal ends of the axle 36 outwardly of the remote sides of the uprights 18 and 20 and the lower end portions of the uprights 18 and 20 include transversely horizontally registered and forwardly opening notches 40 and 42 formed therein, bracing plates 44 and 46 extending along and being secured to the notch defining portions of the uprights 18 and 20 and extending between the uprights 18 and 20 and the skids 32 and 34.

As is conventional, the hand truck 10 additionally includes a horizontal load platform 50 supported from the lower ends of the uprights 18 and 20 and projecting forwardly thereof. When the hand truck 10 is not being used and stationarily supported from the floor 52 disposed therebeneath, the lower peripheral portions of the support wheels 38 rest upon the floor 52 rearwardly of the frame 12 and the undersurface of the load platform 50 rests upon the floor 52 forwardly of the frame 12. However, when the hand truck 10 is being rolled (on wheels 38) from one location to another, the hand truck 12 is angularly displaced about the axis of rotation of the wheels 38 to a position with the frame 12 rearwardly and upwardly inclined and the load platform 50 forwardly and upwardly inclined and elevated to a level generally horizontally registered with the axle 36 or spaced thereabove.

When the hand truck 10 is in the aforementioned inclined position for transport on its wheels 38, the peripheral margin of at least the forward portion of the load platform 50 (rearwardly opening, generally U-shaped in plan) may contact stationary objects such as wall surfaces, doorway jambs and ankle or lower leg portions of adjacent persons. Such contact can damage such wall surfaces and doorway jambs as well as cause painful injuries to ankles and lower leg portions of adjacent persons.

In order to prevent such damage and painful injuries, the hand truck 10 is provided with a U-shaped bumper referred to in general by the reference numeral 56. The U-shaped bumper incorporates a rod-like bail 58 including free leg ends received and secured through diametric bores formed in a pivot shaft 60 oscillatably supported behind the lower portion of the frame 12 through the utilization of journals 62 fixedly mounted relative to the lower ends of the uprights 18 and 20. Stop collars 64 are adjustably positioned on the shaft 60 and are engageable with the journals 62 to prevent longitudinal shifting of the pivot shaft 60 relative to the frame 12, the longitudinal mid-portion of the pivot shaft 60 including a rearwardly and upwardly inclined lever arm 66 supported therefrom.

The lower end portion 68 of a pull rod referred to in general by the reference numeral 70 is pivotally attached to the free end of the lever arm 66 and an expansion spring 72 is connected between a lower portion of the vertical brace 30 and the lever arm 66 to yieldingly bias the lever arm 66 toward its rearwardly and upwardly inclined position illustrated in FIG. 2. The pull rod 70 includes an upper end portion 74 slidably received through a guide sleeve 76 supported from the upper end of the vertical brace 30 and the lower and upper end portions 68 and 74 include a telescopic threaded connection therebetween whereby the effective length of the pull rod 70 may be adjusted.

Figure 4:
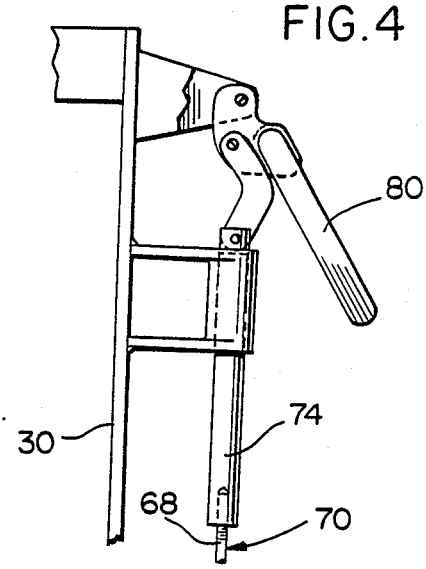
FIG. 4 is a fragmentary side elevational view of the operating mechanism for the bumper by which the latter may be swung between operative an inoperative positions.

The upper end of the upper end portion 74 is pivotally attached as at 78 to a lever-type toggle operator 80 through a connecting link 82 pivotally attached to the operator 80 at 84 and the operator 80 includes an over center limit position illustrated in solid lines in FIG. 2 with the lever arm 66 locked in the rearwardly and upwardly inclined position thereof. In addition, the operator 80 includes a second over center limit position thereof illustrated in solid lines in FIG. 4 in which the lever arm 66 is locked in the rearwardly and downwardly inclined position thereof illustrated in solid lines in FIG. 5.

The bail 58 includes a resilient tubular protective sleeve 85 disposed thereover and the sleeve 85 includes a protective flexible outer covering 86.

When the bail 58 is in the horizontal position thereof illustrated in FIGS. 1 and 2, the bail 58 as well as the protective sleeve 85 project horizontally outwardly beyond all peripheral edges of the load platform 50 disposed forward of the frame 14. However, when the bumper 56 is in the upstanding position thereof illustrated in FIG. 5, the bight portion 87 of the bail 58 as well as the corresponding portions of the sleeve 85 are recessed fully within the recesses 40 and 42, see FIGS. 1 and 5, and the legs 88 of the bail 54 are disposed fully rearward of the front side 14 of the frame 12 defined by the forward facing surfaces of the uprights 18 and 20.

The upper ends of the uprights 18 and 20 are rearwardly and upwardly directed and provided with the usual handgrips 90 and it is deemed readily apparent that when the handgrips 90 are generally horizontally disposed, the frame 16 will be inclined rearwardly between 40° and 45° relative to the horizontal.

Figure 5:
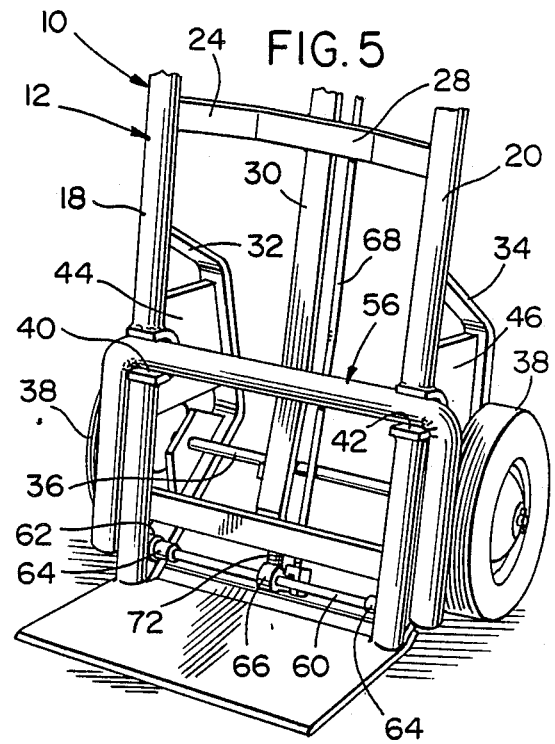
FIG. 5 is a fragmentary perspective view of the lower end portion of the hand truck with the bumper in a raised inoperative position.
Figure 6:
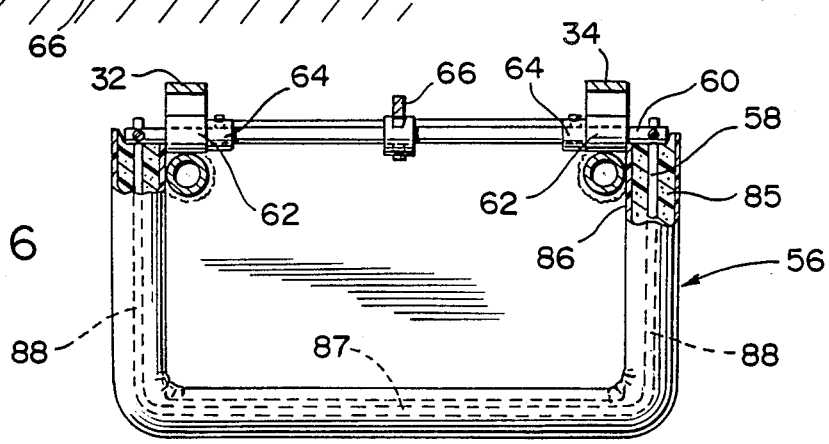
FIG. 6 is an enlarged fragmentary horizontal sectional view taken substantially upon the plane indicated by the section line 6—6 of FIG. 1 and with portions of the outer resilient covering for the bumper being broken away and illustrated in horizontal section.

If it is desired, inasmuch as the operator 80 includes over center locking positions thereof for maintaining the bumper 56 both in the horizontal position thereof illustrated in FIGS. 1 and 2 and the raised inoperative position illustrated in FIG. 5, the expansion spring 72 could be reversed in operation to exert a downward pull on the pull rod 70. In such instance, the bumper 56 also could be used in a partially raised position to clampingly embrace the lower portion of a small load on the load platform 50 comprising, perhaps, a plurality of upstanding tubular members being transported by the hand truck 10.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A hand truck including an upstanding frame having front and rear sides and upper and lower ends, a generally horizontal floor surface engageable load platform supported and projecting forwardly from the lower end of said frame, floor engageable wheel means journalled from said frame rearwardly of said platform and about which said frame and platform, as a unit, may be angularly displaced to tilt said frame toward a rearwardly and upwardly inclined position with said platform being forwardly and upwardly inclined and spaced above a horizontal plane containing the lower periphery of said wheel means, the peripheral margin of at least the forward portion of said platform being generally U-shaped in plan, a marginal edge protection bumper for said peripheral margin to prevent the latter from solidly contacting vertically oriented members such as ankles and lower leg portions of adjacent persons and wall surfaces and door jambs when said hand truck is being moved horizontally forwardly over a floor surface when unladen and when said platform is in said rearwardly and upwardly inclined position, said bumper including a generally U-shaped guard incorporating a pair of generally parallel legs and a bight portion extending between and interconnecting one pair of corresponding ends of said legs, means mounting said guard from said frame for oscillation relative thereto about an axis extending between the other pair of corresponding ends of said legs and spaced behind the lower portion of said front side for swinging movement of said guard between a lowered forwardly projecting and generally horizontal position projecting horizontally outwardly of said peripheral margin and a raised position disposed at least substantially entirely behind said front side, said U-shaped guard including padding thereon facing horizontally outward of said peripheral margin when said guard is in said generally horizontal position, said frame including a pair of laterally spaced upright sides, the lower ends of said uprights being received between said other pair of corresponding ends of said legs when said guard is in said lowered position, said opposite side uprights including generally horizontally registered forwardly opening notches formed therein in which said bight portion is recessed rearward of said front side when said guard is in said raised position.

2. A hand truck including an upstanding frame having front and rear sides and upper and lower ends, a generally horizontal floor surface engageable load platform supported and projecting forwardly from the lower end of said frame, floor engageable wheel means journalled from said frame rearwardly of said platform and about which said frame and platform, as a unit, may be angularly displaced to tilt said frame toward a rearwardly and upwardly inclined position with said platform being forwardly and upwardly inclined and spaced above a horizontal plane containing the lower periphery of said wheel means, the peripheral margin of at least the forward portion of said platform being generally U-shaped in plan, a marginal edge protection bumper for said peripheral margin to prevent the latter from solidly contacting vertically oriented members such as ankles and lower leg portions of adjacent persons and wall surfaces and door jambs when said hand truck is being moved horizontally forwardly over a floor surface when unladen and when said platform is in said rearwardly and upwardly inclined position, said bumper including a generally U-shaped guard incorporating a pair of generally parallel legs and a bight portion extending between and interconnecting one pair of corresponding ends of said legs, means mounting said guard from said frame for oscillation relative thereto about an axis extending between the other pair of corresponding ends of said legs and spaced behind the lower portion of said front side for swinging movement of said guard between a lowered forwardly projecting and generally horizontal position projecting horizontally outwardly of said peripheral margin and a raised position disposed at least substantially entirely behind said front side, said U-shaped guard including padding thereon facing horizontally outward of said peripheral margin when said guard is in said generally horizontal position, said upper end of said frame including an operator shiftably supported therefrom for movement between first and second positions, connecting means operatively connecting said operator to said bumper for swinging the latter between the raised and lowered positions thereof responsive to shifting of said operator between said first and second positions, respectively.

3. The hand truck of claim 2 wherein said second position of said operator comprises an over center limit position of movement thereof.

4. The hand truck of claim 2 wherein said first position of said operator comprises an over center limit position of movement thereof.

5. The hand truck of claim 4 wherein said second position of said operator comprises an over center limit position of movement thereof.

6. The hand truck of claim 5 wherein said hand truck includes means yieldingly biasing said operator toward one of said first and second positions thereof.

7. The combination of claim 6 wherein said one position of said first and second positions comprises said first position.

8. The hand truck of claim 2 wherein said operator comprises a pivotally mounted lever-type toggle acuator and said first and second positions thereof comprise over center limit positions of movement thereof.

9. The hand truck of claim 2 wherein said frame includes a pair of laterally spaced opposite side uprights, the lower ends of said uprights being received between said other pair of corresponding ends of said legs when said guard is in said lowered position.

10. A hand truck including an upstanding frame having front and rear sides and upper and lower ends, a generally horizontal floor surface engageable load platform supported and projecting forwardly from the lower end of said frame, floor engageable wheel means journalled from said frame for rotation about a generally horizontal axis extending transversely of said hand truck and space rearwardly of said rear side of said frame above said lower end of said frame, a generally horizontal U-shaped guard incorporating a pair of generally parallel legs and a bight portion extending between and interconnecting one pair of corresponding ends of said legs, means mounting said guard from said guard for oscillation relative thereto about a second axis generally paralleling said first axis and spaced behind said front side of said frame for swinging movement of said guard between a lowered forwardly projecting position closely overlying said platform and a raised position disposed at least substantially entirely rearwardly of said front side, said U-shaped guard projecting horizontally outwardly of at least substantially all of the peripheral marginal portions of said platform disposed forward of said frame and including padding thereon facing horizontally outwardly of said peripheral margin when said guard is in said lowered position, said frame including a pair of laterally spaced opposite side uprights, the lower ends of said uprights being received between said other pair of corresponding ends of said legs when said guard is in said lowered position, said opposite side uprights including generally horizontally registered forwardly opening notches formed therein in which said bight portion is recessed rearward of said front side when said guard is in said raised position.

11. A hand truck including an upstanding frame having front and rear sides and upper and lower ends, a generally horizontal floor surface engageable load platform supported and projecting forwardly from the lower end of said frame, floor engageable wheel means journalled from said frame for rotation about a generally horizontal axis extending transversely of said hand truck and spaced rearwardly of said rear side of said frame above said lower end of said frame, a generally horizontal U-shaped guard incorporating a pair of generally parallel legs and a bight portion extending between and interconnecting one pair of corresponding ends of said legs, means mounting said guard from said guard for oscillation relative thereto about a second axis generally paralleling said first axis and spaced behind said front side of said frame for swinging movement of said guard between a lowered forwardly projecting position closely overlying said platform and a raised position disposed at least substantially entirely rearwardly of said front side, said U-shaped guard projecting horizontally outwardly of at least substantially all of the peripheral marginal portions of said platform disposed forward of said frame and including padding thereon facing horizontally outwardly of said peripheral margin when said guard is in said lowered position, said upper end of said frame including an operator shiftably supported therefrom for movement between first and second positions, connecting means operatively connecting said operator to said bumper for swinging the latter between the raised and lowered positions thereof responsive to shifting of said operator between first and second positions, respectively.

12. The hand truck of claim 11 wherein said frame includes a pair of laterally spaced opposite side uprights, the lower ends of said uprights being received between said other pair of corresponding ends of said legs when said guard is in said lowered position.

* * * * *